(12) United States Patent
Qi

(10) Patent No.: US 10,899,227 B2
(45) Date of Patent: Jan. 26, 2021

(54) TOUCH DISPLAY DEVICE AND MANUFACTURE METHOD THEREOF

(71) Applicants: Chengdu BOE Optoelectronics Technology Co., Ltd., Sichuan (CN); BOE TECHNOLOGY GROUP CO., LTD., Beijing (CN)

(72) Inventor: Puyu Qi, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/581,821

(22) Filed: Sep. 25, 2019

(65) Prior Publication Data

US 2020/0238828 A1 Jul. 30, 2020

(30) Foreign Application Priority Data

Jan. 24, 2019 (CN) .......................... 2019 1 0069113

(51) Int. Cl.
*B60K 37/02* (2006.01)

(52) U.S. Cl.
CPC ...... *B60K 37/02* (2013.01); *B60K 2370/1438* (2019.05); *B60K 2370/27* (2019.05); *B60K 2370/349* (2019.05)

(58) Field of Classification Search
None
See application file for complete search history.

(56) References Cited

U.S. PATENT DOCUMENTS

2013/0278544 A1* 10/2013 Cok .................. G06F 3/044
345/174
2017/0285821 A1* 10/2017 Liang ................ G06F 3/0412

* cited by examiner

*Primary Examiner* — Britt D Hanley
(74) *Attorney, Agent, or Firm* — Calfee, Halter & Griswold LLP

(57) ABSTRACT

Disclosed is a touch display device and a manufacture method thereof. The touch display device includes a display panel and a touch module stacked together. The touch module includes a first electrode layer, a light absorbing layer and a second electrode layer sequentially stacked on a surface of the display panel. The first electrode layer includes a plurality of first touch electrodes arranged at intervals in a first direction; the light absorbing layer includes a plurality of first sub-light absorbing layers arranged at intervals in the first direction; at least one of the plurality of first sub-light absorbing layers corresponds to at least one of the plurality of first touch electrodes and is on a side of a corresponding first touch electrode facing away from the display panel; and the second electrode layer includes a plurality of second touch electrodes arranged at intervals in a second direction; the first direction intersects the second direction.

17 Claims, 7 Drawing Sheets

TOUCH DISPLAY DEVICE AND MANUFACTURE METHOD THEREOF

RELATED APPLICATIONS

The present application claims the benefit of Chinese Patent Application No. 201910069113.X, filed on Jan. 24, 2019, the entire disclosures of which are incorporated herein by reference.

TECHNICAL FIELD

This disclosure relates to the field of display technologies, and specifically to a touch display device and a manufacturing method thereof.

BACKGROUND

Organic light emitting displays have a wide viewing angle, which, despite of its advantages in fields such as cell phone or the like, presents certain problems when applied in a vehicle. As shown in FIG. 1, due to the position where an in-vehicle display 100 is located, it will generally cast a reflected image on the front windshield. This is particularly obvious at night, which can interfere with the driver's observation of the road condition outside the vehicle and hence affect driving safety.

Light control film (LCF) is an optical film that can be used for adjusting the transmission of light and has a structure of a louver made of a light absorbing material. Under the influence of the light absorbing material, images are visible when viewed at a perpendicular viewing angle. However, as the viewing angle increases, the amount of light transmitted through the LCF will gradually decrease. When a certain angle is reached, the images will no longer be visible. The basic structure of the LCF currently available on the market is that a louver layer is sandwiched between upper and lower polycarbonate protective layers. Due to the presence of protective layers and adhesive materials, the LCF may generally have a thickness of 300 μm or more, which makes it impossible to realize flexibility and thinning of the product. Therefore, the existing display devices still need improvement.

SUMMARY

In one aspect of this disclosure, the exemplary embodiments of this disclosure provide a touch display device. According to an exemplary embodiment of this disclosure, the touch display device includes a display panel and a touch module stacked together, wherein the touch module includes a first electrode layer, a light absorbing layer, and a second electrode layer sequentially stacked on a surface of the display panel. The first electrode layer includes a plurality of first touch electrodes arranged at intervals in a first direction; the light absorbing layer includes a plurality of first sub-light absorbing layers arranged at intervals in the first direction; at least one of the plurality of first sub-light absorbing layers corresponds to at least one of the plurality of first touch electrodes and is on a side of a corresponding first touch electrode facing away from the display panel; and wherein the second electrode layer includes a plurality of second touch electrodes arranged at intervals in a second direction; the first direction intersects the second direction.

According to an exemplary embodiment, the plurality of first touch electrodes correspond to the plurality of first sub-light absorbing layers one by one; each of the first touch electrodes is embedded in a corresponding first sub-light absorbing layer.

According to an exemplary embodiment, the touch display device further includes a light transmitting layer between the second electrode layer and the display panel; the plurality of first sub-light absorbing layers are embedded in the light transmitting layer.

According to an exemplary embodiment, the light transmitting layer is made of a transparent resin material.

According to an exemplary embodiment, the light absorbing layer further includes a plurality of second sub-light absorbing layers arranged at intervals in the second direction; the plurality of second sub-light absorbing layers correspond to the plurality of second touch electrodes one by one; the plurality of second sub-light absorbing layers and the plurality of first sub-light absorbing layers form a grid structure.

According to an exemplary embodiment, the light absorbing layer is made of a black resin material.

According to an exemplary embodiment, the first sub-light absorbing layers and the second sub-light absorbing layers are arranged periodically; the first sub-light absorbing layers have a first periodic distance of 30~300 μm, and the second sub-light absorbing layers have a second periodic distance of 30~300 μm.

According to an exemplary embodiment, two adjacent first sub-light absorbing layers have a pitch of 10~295 μm, and two adjacent second sub-light absorbing layers have a pitch of 10~295 μm.

According to an exemplary embodiment, the first touch electrodes and the second touch electrodes have a width smaller than or equal to a width of the first sub-light absorbing layers and the second sub-light absorbing layers, and the first sub-light absorbing layers and the second sub-light absorbing layers have a width smaller than or equal to a width of a pixel definition layer in the display panel.

According to an exemplary embodiment, the first sub-light absorbing layers and the second sub-light absorbing layers have a width of 5~30 μm, and the first sub-light absorbing layers and the second sub-light absorbing layers have a height of 5~50 μm.

In another aspect of this disclosure, the exemplary embodiments provide an automobile. According to an exemplary embodiment, the automobile includes the touch display device mentioned above.

According to an exemplary embodiment, the plurality of first touch electrodes correspond to the plurality of first sub-light absorbing layers one by one; each of the first touch electrodes is embedded in a corresponding first sub-light absorbing layer.

According to an exemplary embodiment, the automobile further includes a light transmitting layer between the second electrode layer and the display panel; the plurality of first sub-light absorbing layers are embedded in the light transmitting layer.

According to an exemplary embodiment, the light absorbing layer further includes a plurality of second sub-light absorbing layers arranged at intervals in the second direction; the plurality of second sub-light absorbing layers correspond to the plurality of second touch electrodes one by one; the plurality of second sub-light absorbing layers and the plurality of first sub-light absorbing layers form a grid structure.

According to an exemplary embodiment, the first sub-light absorbing layers and the second sub-light absorbing layers are arranged periodically; the first sub-light absorbing layers have a first periodic distance of 30~300 μm, and the second sub-light absorbing layers have a second periodic distance of 30~300 μm.

According to an exemplary embodiment, the first touch electrodes and the second touch electrodes have a width smaller than or equal to a width of the first sub-light absorbing layers and the second sub-light absorbing layers, and the first sub-light absorbing layers and the second sub-light absorbing layers have a width smaller than or equal to a width of a pixel definition layer in the display panel.

In still another aspect of this disclosure, the exemplary embodiments provide a method of manufacturing the touch display device mentioned above. According to an exemplary embodiment, the method includes forming a first electrode layer, a light absorbing layer and a second electrode layer sequentially on a surface of the display panel by a patterning process.

According to an exemplary embodiment, forming the first electrode layer or the second electrode layer includes: coating a conductive paste and drying the conductive paste to form a conductive coating; and etching the conductive coating to form a pattern of the first electrode layer or a pattern of the second electrode layer.

According to an exemplary embodiment, the method further includes forming a light transmitting layer between the second electrode layer and the display panel.

According to an exemplary embodiment, forming the light transmitting layer includes: coating a light transmissive material and curing the light transmissive material to obtain a cured coating; and etching or imprinting the cured coating to form a trench penetrating the cured coating. Forming the light absorbing layer includes: casting a light absorbing material in the trench and curing the light absorbing material to form the light absorbing layer.

BRIEF DESCRIPTION OF THE DRAWINGS

In order to more clearly illustrate the technical solutions in embodiments of the disclosure or in the related art, the appended drawings needed to be used in the description of the exemplary embodiments or the related art will be introduced briefly in the following. Obviously, the drawings in the following description are only some exemplary embodiments of the disclosure, and for those of ordinary skills in the art, other drawings can be obtained according to these drawings under the premise of not paying out creative work.

DETAILED DESCRIPTION

In the following, the technical solutions in the exemplary embodiments will be described clearly and completely in connection with the drawings in the embodiments of the disclosure. Obviously, the described embodiments are only part of the embodiments of the disclosure, and not all of the embodiments. Based on the exemplary embodiments, all other embodiments obtained by those of ordinary skills in the art under the premise of not paying out creative work pertain to the protection scope of the disclosure.

This disclosure aims to solve the technical problems in related art. To this end, one objective of this disclosure is to propose a touch display device with a narrow viewing angle for preventing reflected images from being casted on the windshield when used as an in-vehicle display device, or with a thin thickness suitable for being bent or curved, as well as a manufacture method thereof.

Figure 1:
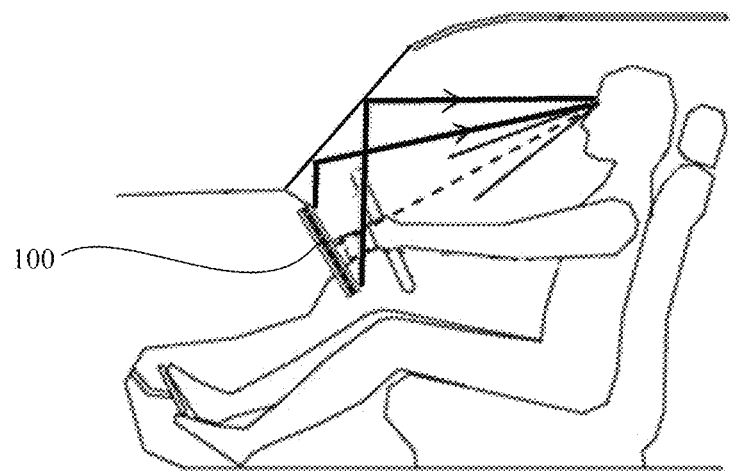
FIG. 1 is a schematic view showing that an in-vehicle display device casts a reflected image on the windshield.
Figure 2:
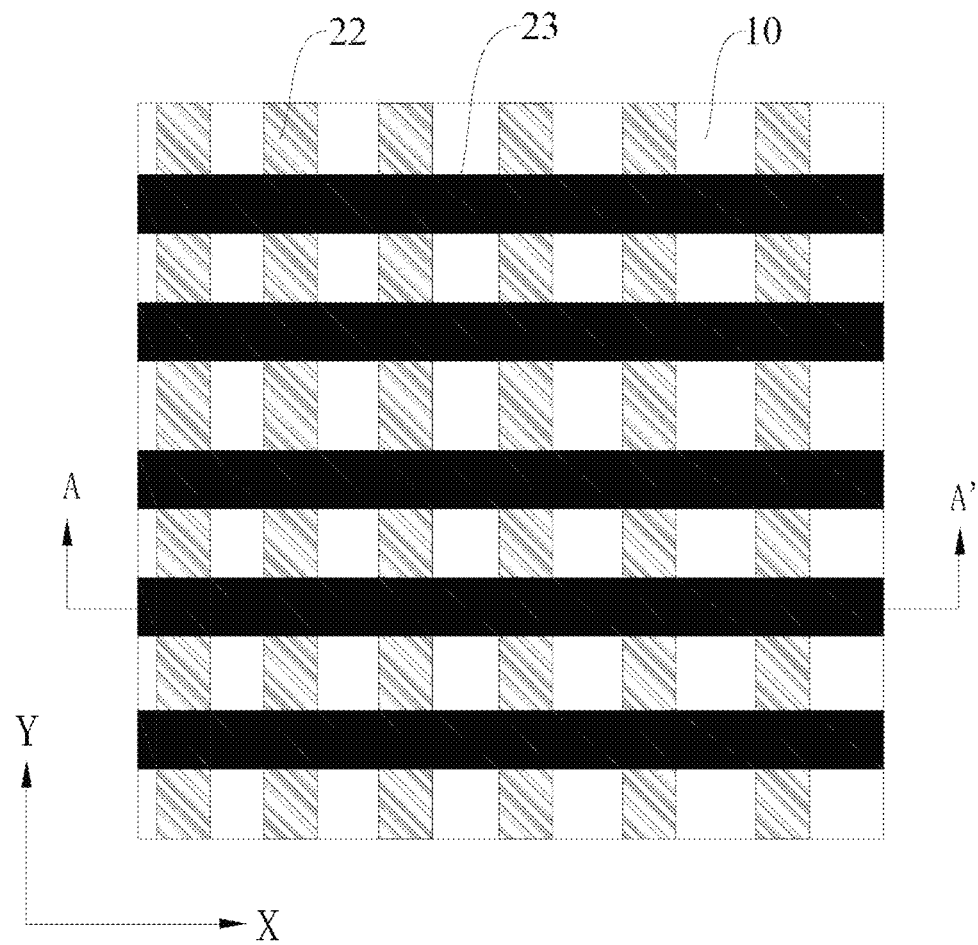
FIG. 2 is a plan view of a touch display device according to an exemplary embodiment.
Figure 3:
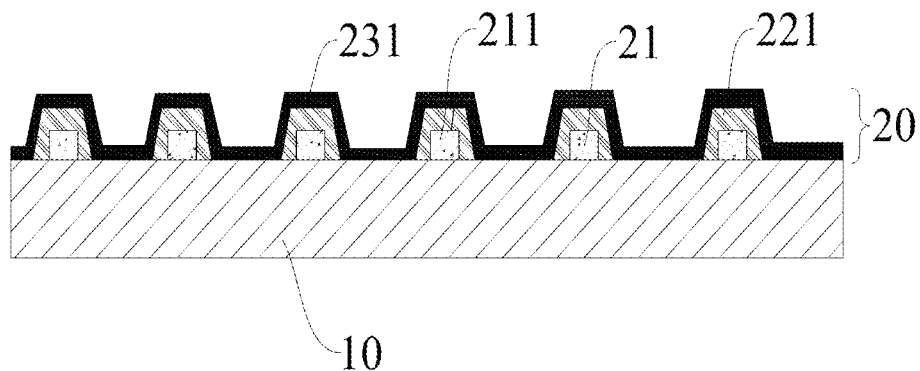
FIG. 3 is a section view of the structure shown in FIG. 2 taken along line A-A'.

In one aspect of this disclosure, the exemplary embodiments provide a touch display device. According to an embodiment of this disclosure, referring to FIG. 2 and FIG. 3, the touch display device includes a display panel 10 and a touch module 20 stacked together, and the touch module 20 includes a first electrode layer 21, a light absorbing layer 22 and a second electrode layer 23 sequentially stacked on a surface of the display panel. The first electrode layer 21 includes a plurality of first touch electrodes 211 arranged at intervals in a first direction X; the light absorbing layer 22 includes a plurality of first sub-light absorbing layers 221 arranged at intervals in the first direction X; at least one of the plurality of first sub-light absorbing layers 221 corresponds to at least one of the plurality of first touch electrodes 211 and is on a side of a corresponding first touch electrode 211 facing away from the display panel 10; and the second electrode layer 23 includes a plurality of second touch electrodes 231 arranged at intervals in a second direction Y; the first direction X intersects the second direction Y.

The touch display device may have a narrow viewing angle through arrangement of the light absorbing layer. Since at least part of the first touch electrodes are hidden beneath the light absorbing layer, the reflectivity can be reduced and the visibility under strong light can be improved. Especially when applied to an in-vehicle display device, the touch display device can prevent reflected images from being casted on the windshield, which avoids interfering with the driver's observation of the road condition and hence improves the driving safety. Besides, by integrating the light absorbing layer and the touch electrodes, the thickness of the touch display device can be effectively reduced, which facilitates bending and curving of the product.

According to an exemplary embodiment, the display panel in the touch display device may be a conventional organic light emitting display panel, and the specific structure thereof is also a structure of a conventional organic light emitting display panel, which will not be detailed herein for simplicity. Moreover, those skilled in the art can understand that the touch module is arranged on a surface displaying images on the display panel. Optionally, the first direction X and the second direction Y are perpendicular to each other.

In some exemplary embodiments, the plurality of first touch electrodes correspond to the plurality of first sub-light absorbing layers one by one; each of the first touch electrodes is embedded in a corresponding first sub-light absorbing layer. According to an exemplary embodiment, the number of the first touch electrodes and the number of the first sub-light absorbing layers can be either the same, or different. In some exemplary embodiments, the number of the first touch electrodes can be greater than that of the first sub-light absorbing layers, and part of the first touch electrodes are embedded in the first sub-light absorbing layers. In some other exemplary embodiments, the number of the first touch electrodes is smaller than that of the first sub-light absorbing layers, and part of the first touch electrodes are embedded in the first sub-light absorbing layers; alternatively, all of the first touch electrodes are embedded in the first sub-light absorbing layers, i.e., each first touch electrode is embedded in a first sub-light absorbing layer. In still some other embodiments, the number of the first touch electrodes and the number of the first sub-light absorbing layers can be equal, and the first touch electrodes correspond to the first sub-light absorbing layers one by one; alternatively, only part of the first touch electrodes are embedded in the first sub-light absorbing layers. Thus, the first sub-light absorbing layers can shield the first touch electrodes, which can reduce the reflectivity and improve the visibility of the touch display device under strong light. Those skilled in the art can understand that, in order to obtain a better effect of reflectivity reduction, all of the first touch electrodes are embedded in the first sub-light absorbing layers, i.e., each first touch electrode is embedded in a first sub-light absorbing layer.

Figure 11:
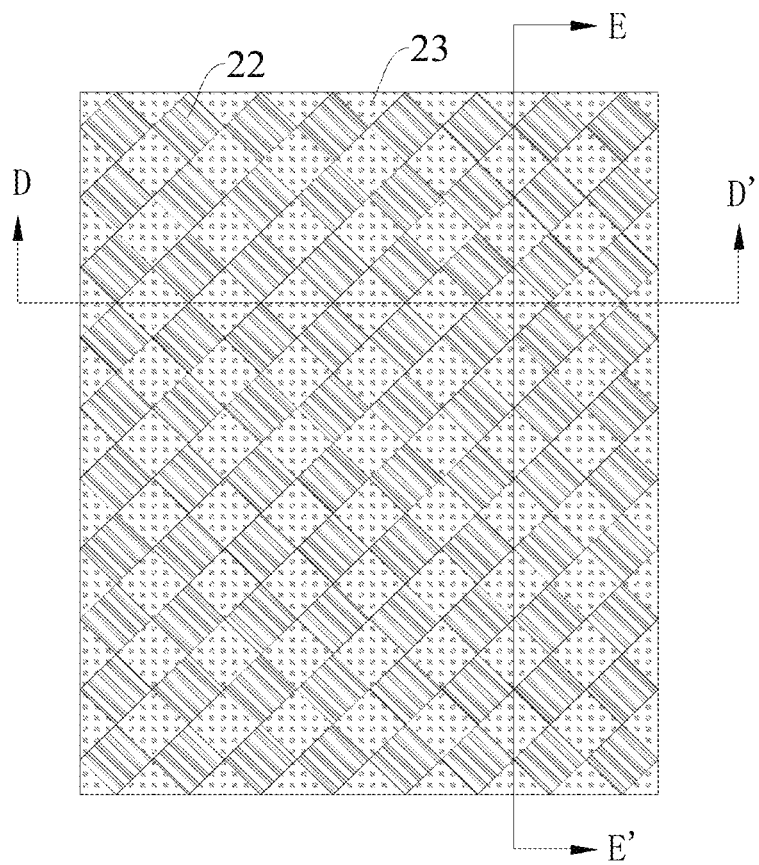
FIG. 11 is a plan view of a touch display device according to an exemplary embodiment.
Figure 12:
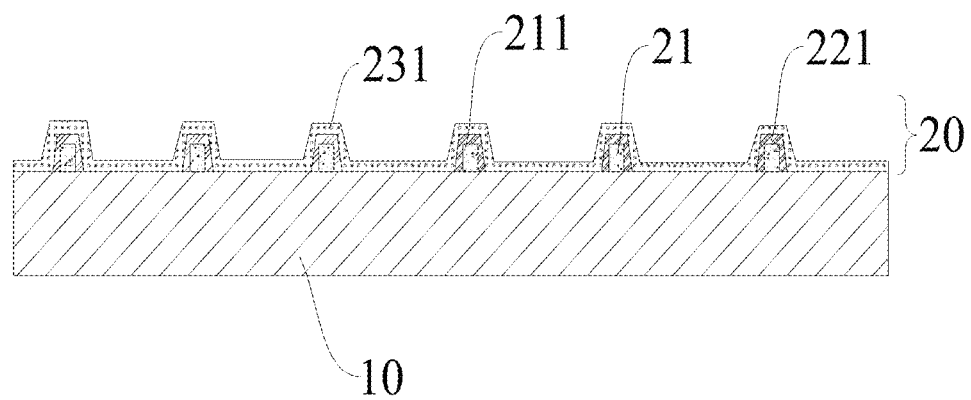
FIG. 12 is a section view of the structure shown in FIG. 11 taken along line D-D'.
Figure 13:
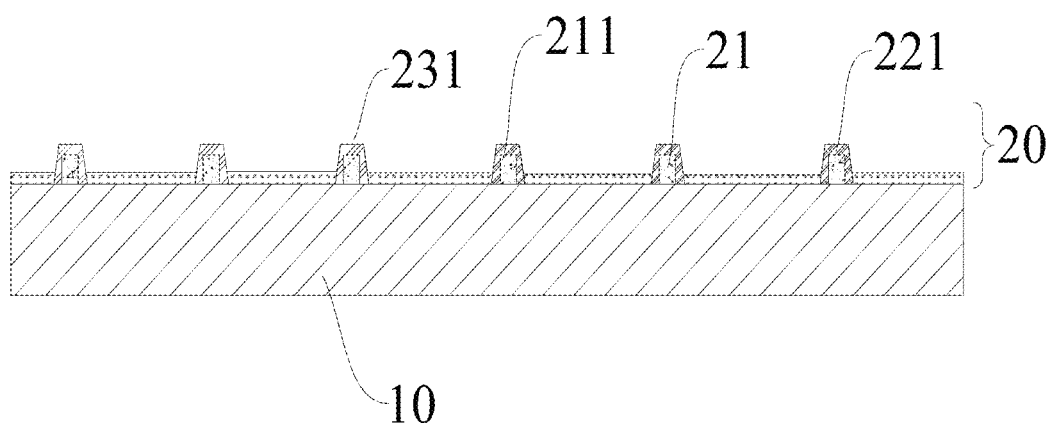
FIG. 13 is a section view of the structure shown in FIG. 11 taken along line E-E'.

According to an exemplary embodiment, the material for forming the first touch electrodes may be a transparent conductive material, for example, including but not limited to a transparent conductive oxide such as indium tin oxide, tin oxide, indium zinc oxide, or the like. In this way, the first touch electrodes have both good conductivity and high transmittance, which can help to improve the display effect. According to an exemplary embodiment, the specific shape of the first touch electrodes is not particularly limited or demanded as long as it can satisfy the touch requirement. The first touch electrodes may have any shape, for example, including but not limited to elongated strips extending in the second direction (see FIG. 2), or a plurality of rhombuses connected in the second direction (see FIG. 11 to FIG. 13) and so on. Besides, the thickness, the width, the length or the like of the first touch electrodes may also be selected flexibly by those skilled in the art based upon actual touch requirements. Moreover, those skilled in the art can understand that the second touch electrodes may have the same shape and be made of the same material as the first touch electrodes, which will not be detailed herein for simplicity.

According to some exemplary embodiments, in a direction perpendicular to the plane defined by the first direction and the second direction, at an intersection position, the distance between the first touch electrodes and the second touch electrodes may be greater than 50 µm, e.g., 50 µm, 51 µm, 52 µm, 53 µm, 54 µm, 55 µm, 56 µm, 57 µm, 58 µm, 59 µm, 60 µm and so on. This helps to improve the touch sensitivity and accuracy of the touch display device.

Figure 4:
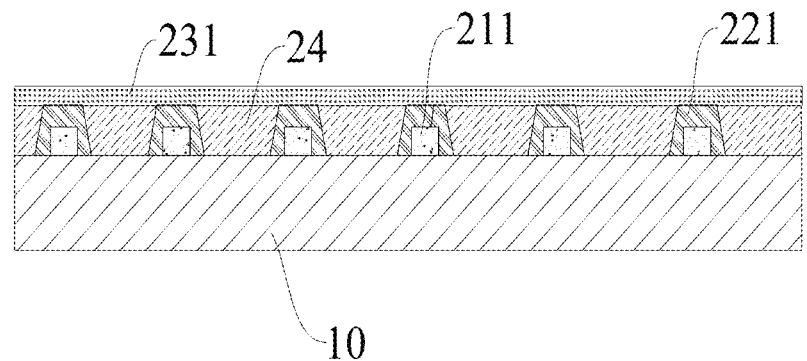
FIG. 4 is a section view of a touch display device according to an exemplary embodiment.
Figure 5:
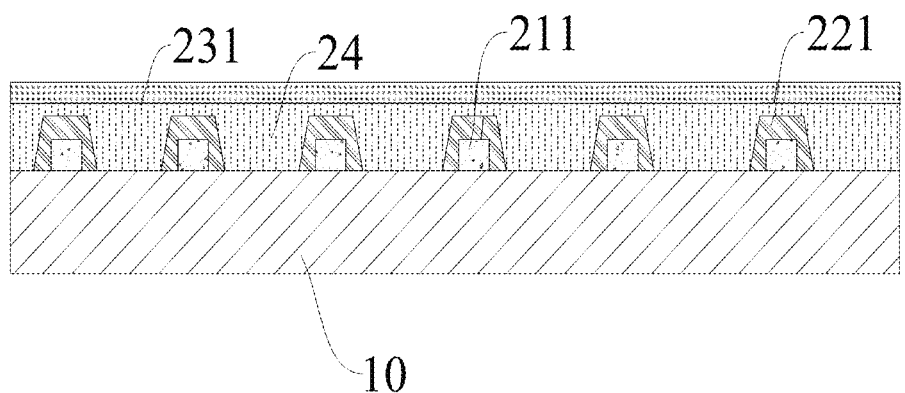
FIG. 5 is a section view of a touch display device according to an exemplary embodiment.

According to an exemplary embodiment, in order to avoid wire breakage caused by an excessively large segment difference of the second electrode layer, with reference to FIG. 4 and FIG. 5, the touch display device further includes a light transmitting layer 24 arranged between the second electrode layer 23 and the display panel 10, and the plurality of first sub-light absorbing layers 221 are embedded in the light transmitting layer 24. Accordingly, the light transmitting layer can fill the segment difference formed by the first electrode layer and the light absorbing layer to form a planar surface, and the second electrode layer can be formed on the planar surface without an excessively large segment difference or even without any segment difference, which greatly reduces the possibility of wire breakage on the second electrode layer and improves the reliability and the yield of the touch display device.

According to some exemplary embodiments, with reference to FIG. 4, the surface of the light transmitting layer 24 facing away from the display panel 10 may be flush with the surface of the first sub-light absorbing layer 221 facing away from the display panel 10 such that the two surfaces can together form a planar surface suitable for forming the second electrode layer; according to some other exemplary embodiments, with reference to FIG. 5, the light transmitting layer 24 covers the surface of the first sub-light absorbing layer 221 facing away from the display panel 10 such that the surface of the light transmitting layer 24 facing away from the display panel 10 forms a planar surface suitable for forming the second electrode layer, and the manufacture process is comparatively easier.

According to an exemplary embodiment, the light transmitting layer may be made of a transparent resin material, for example including but not limited to polyimide resin or acrylic resin and the like. In this way, with a higher transmittance, it will not affect the display effect and the touch effect of the touch display device, and moreover, the material is easily available from a wide range of choices and the cost is low.

Figure 6:
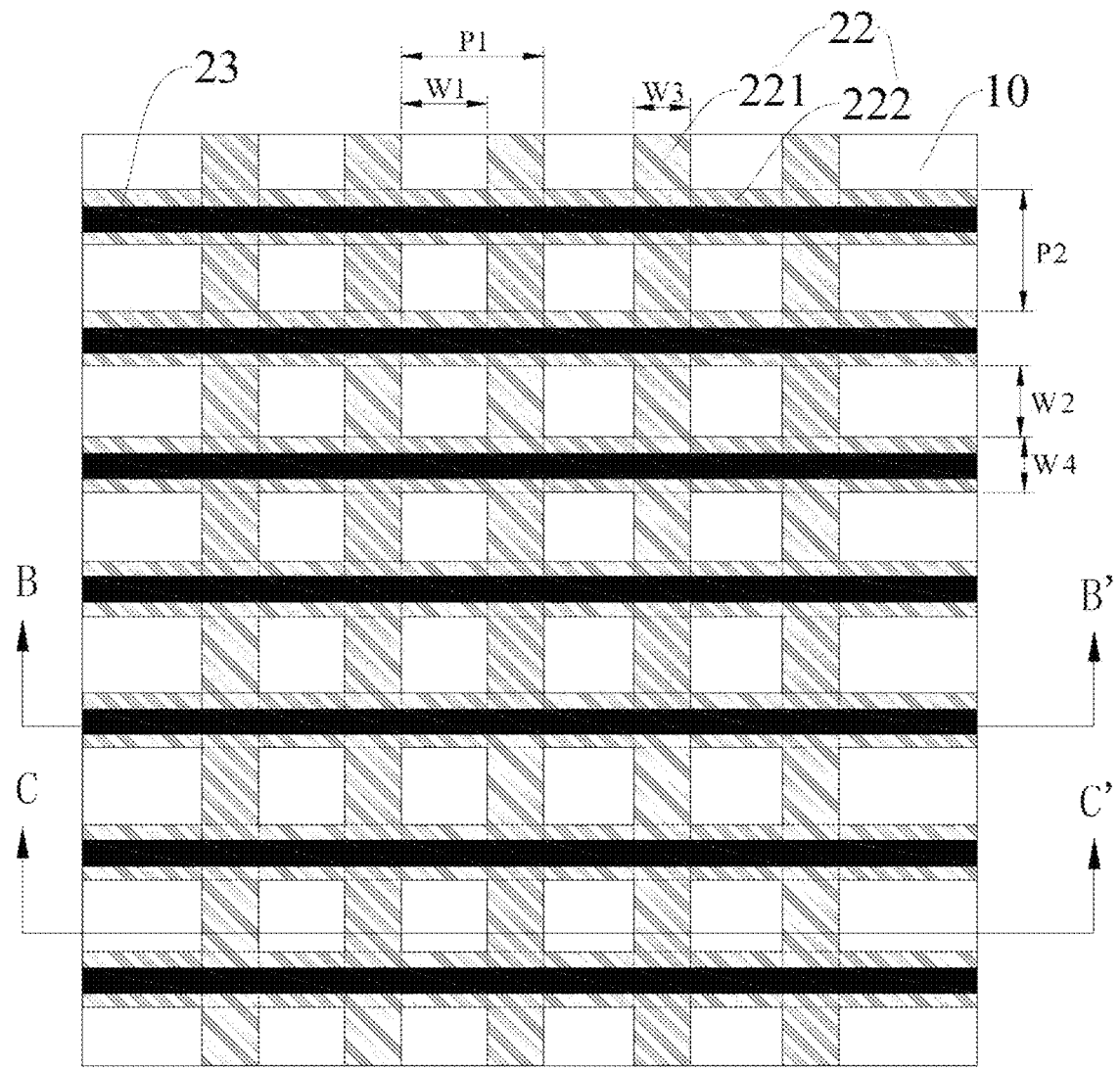
FIG. 6 is a plan view of a touch display device according to an exemplary embodiment.
Figure 7:
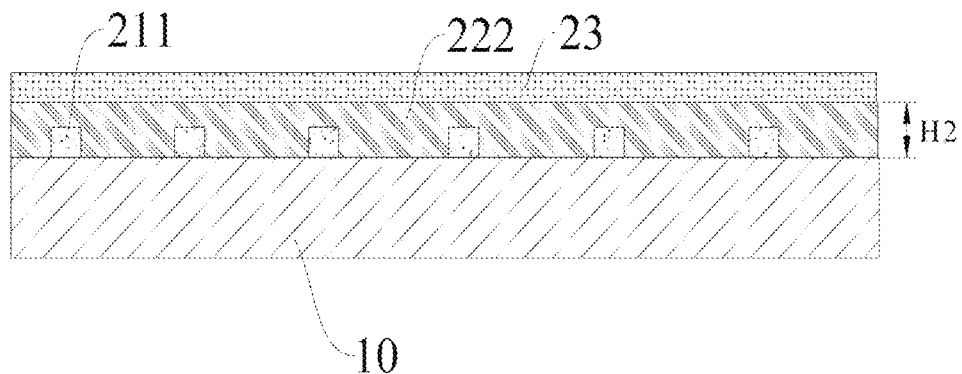
FIG. 7 is a section view of the structure shown in FIG. 6 taken along line B-B'.
Figure 8:
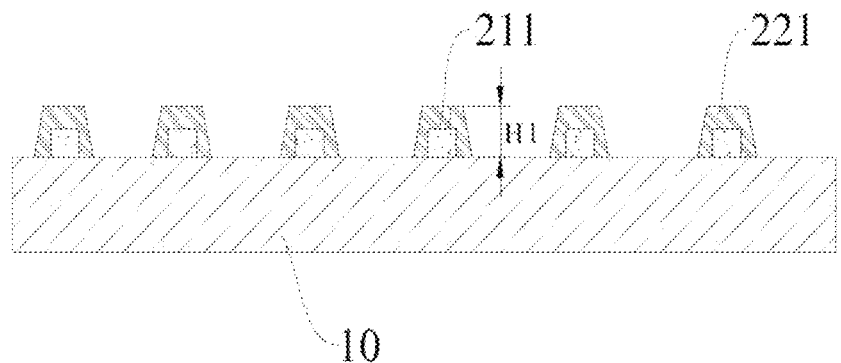
FIG. 8 is a section view of the structure shown in FIG. 6 taken along line C-C'.

According to an exemplary embodiment, with reference to FIG. 6, FIG. 7 and FIG. 8, the light absorbing layer 22 further includes a plurality of second sub-light absorbing layers 222 arranged at intervals in the second direction; the plurality of second sub-light absorbing layers 222 correspond to the plurality of second touch electrodes 231 one by one; the plurality of second sub-light absorbing layers 222 and the plurality of first sub-light absorbing layers 221 form a grid structure. The structure can simultaneously reduce the large viewing angle brightness in the horizontal azimuth direction and the vertical azimuth direction. Accordingly, in addition to preventing the reflected image of the touch display device casted on the front windshield, the structure can also effectively reduce the visibility of the display image to the driver, thereby avoiding disturbing the driver and hence improving the driving safety. In particular, the structure may also be used as a display device in front of the front passenger's seat.

It should be noted that the depiction of "azimuth" herein refers to: when the observer faces the screen of the touch display device, the direction on his/her right is a 0° horizontal azimuth, and when the direction is rotated 90° counterclockwise, a 90° horizontal azimuth can be obtained; the depictions of "horizontal azimuth direction" and "vertical azimuth direction" herein refer to: based on a line connecting the observer's eyes, the direction parallel thereto is the horizontal azimuth direction, and the direction perpendicular thereto is the vertical azimuth direction.

According to an exemplary embodiment, the light absorbing layer is made of a black resin material. Specifically, it may be obtained by mixing in a conventional resin material carbon black or pigments obtained from the dispersion of other materials in a solvent, which can be flexibly selected by those skilled in the art upon actual needs. Therefore, it has a good light absorbing effect, and the material is available from a wide range of choices and the cost is low.

According to an exemplary embodiment, in order to obtain a suitable viewing angle, the first sub-light absorbing layers and the second sub-light absorbing layers are arranged periodically in the light absorbing layer. For instance, the first periodic distance P1 of the first sub-light absorbing layers and the second periodic distance P2 of the second sub-light absorbing layers may be 30~300 µm, such as 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, and so on. In this way, the touch display device can be characterized by a narrow viewing angle in the vertical azimuth direction (e.g., as indicated by a narrow viewing angle 200 in FIG. 10), and when applied to an in-vehicle display device, it can effectively prevent reflections of the images of the display panel casted on the windshield.

According to an exemplary embodiment, the viewing angle characteristics of the touch display device may be tuned by adjusting a pitch between adjacent first sub-light absorbing layers and a pitch between adjacent second sub-light absorbing layers. Different pitches result in different viewing angle characteristics. Different viewing angle requirements can be satisfied by adjusting the pitch. If the viewing angle is required to be narrower, the pitch can be arranged to be smaller. In some exemplary embodiments, in order to obtain a better effect of viewing angle adjustment, the pitch W1 between two adjacent first sub-light absorbing layers is 10~295 µm, such as 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 295 µm, and so on. The pitch W2 between two adjacent second sub-light absorbing layers is 10~295 µm, such as 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 295 µm, and so on. In this way, the touch display device can be characterized by a narrow viewing angle in the vertical azimuth direction, and when used in a vehicle, it can effectively prevent reflections of the images of the display panel casted on the windshield.

According to an exemplary embodiment, widths of the first sub-light absorbing layers and the second sub-light absorbing layers may be arranged based on widths of the first touch electrodes, the second touch electrodes, the light emitting layer and the pixel definition layer in the display panel, and specifically, the first touch electrodes and the second touch electrodes have a width smaller than or equal to a width of the first sub-light absorbing layers and the second sub-light absorbing layers, and the first sub-light absorbing layers and the second sub-light absorbing layers have a width smaller than or equal to a width of the pixel definition layer. Thus, an orthogonal projection of the pixel definition layer in a direction perpendicular to the display panel overlaps orthogonal projections of the first sub-light absorbing layers and the second sub-light absorbing layers in the direction perpendicular to the display panel, which avoids shielding the light emitting elements of the display panel and affecting the display effect.

In some specific embodiments, the width W3 of the first sub-light absorbing layers or the width W4 of the second sub-light absorbing layers may be 5~30 µm, such as 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, 25 µm, 26 µm, 27 µm, 28 µm, 29 µm, 30 µm, and so on. Accordingly, while the viewing angle is effectively adjusted, the display effect of the touch display device will not be affected and most of the display panel can be matched.

According to an exemplary embodiment, the viewing angle characteristics of the touch display device may also be tuned by adjusting heights of the first sub-light absorbing layers and the second sub-light absorbing layers, and the higher the heights are, the narrower the viewing angle will be. In some specific embodiments, the height H1 of the first sub-light absorbing layers or the height H2 of the second sub-light absorbing layers may be 5~50 µm, such as 5 µm, 10 µm, 15 µm, 20 µm, 25 µm, 30 µm, 35 µm, 40 µm, 45 µm, 50 µm, and so on. In this way, the touch display device can be characterized by a narrow viewing angle in the vertical azimuth direction, and when used in a vehicle, it can effectively prevent reflections of the images of the display panel casted on the windshield.

Figure 9:
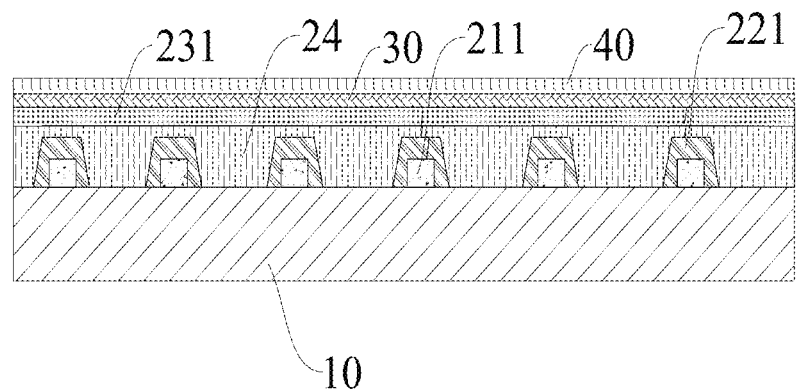
FIG. 9 is a section view of a touch display device according to an exemplary embodiment.

According to an exemplary embodiment, with reference to FIG. 9, the touch display device further includes: a polarizer 30 arranged on a side of the touch module 20 facing away from the display panel 10; and a protective film 40 arranged on a side of the polarizer 30 facing away from the display panel 10. This can bring the touch display device a better display effect and protect the touch display device against damage. Specifically, the polarizer 30 and the protective film 40 can be a conventional polarizer and a conventional protective film. In some specific embodiments, the polarizer 30 may be a circular polarizer, and the protective film 40 may be a plastic material such as polyethylene terephthalate (PET) or cyclo olefin polymer (COP).

Figure 10:
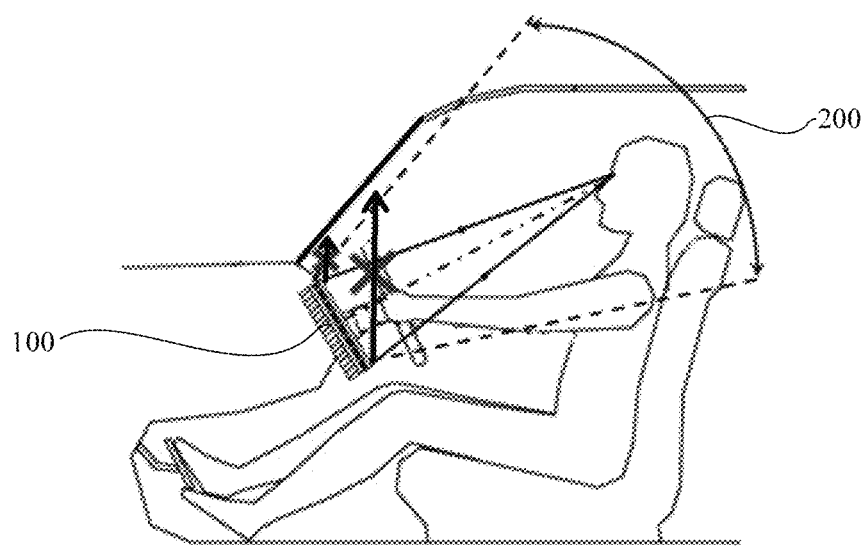
FIG. 10 is a schematic view of a touch display device according to an exemplary embodiment used as an in-vehicle display device.

In another aspect of this disclosure, the exemplary embodiments provide an automobile. According to an exemplary embodiment, the automobile includes the touch display device mentioned above. In this way, as shown in FIG. 10, when the touch display device 100 in the automobile works, it will not cast a reflected image on the front windshield of the automobile, which avoids interfering with the driver's observations of the road condition and improves the driving safety.

Those skilled in the art can understand that apart from the aforementioned touch display device, the automobile includes all structures and parts necessary for a conventional automobile, e.g., a body, doors, windows, chassis, tires, an engine, electrical equipment and so on, which will not be detailed herein for simplicity.

According to an exemplary embodiment, the plurality of first touch electrodes correspond to the plurality of first sub-light absorbing layers one by one; each of the first touch electrodes is embedded in a corresponding first sub-light absorbing layer. According to an exemplary embodiment, the number of the first touch electrodes and the number of the first sub-light absorbing layers can be either the same, or different. In some exemplary embodiments, the number of the first touch electrodes can be greater than that of the first sub-light absorbing layers, and part of the first touch electrodes are embedded in the first sub-light absorbing layers. In some other exemplary embodiments, the number of the first touch electrodes is smaller than that of the first sub-light absorbing layers, and part of the first touch electrodes are embedded in the first sub-light absorbing layers; alternatively, all of the first touch electrodes are embedded in the first sub-light absorbing layers, i.e., each first touch electrode is embedded in a first sub-light absorbing layer. In still some other exemplary embodiments, the number of the first touch electrodes and the number of the first sub-light absorbing layers can be equal, and the first touch electrodes correspond to the first sub-light absorbing layers one by one; alternatively, only part of the first touch electrodes are embedded in the first sub-light absorbing layers. Thus, the first sub-light absorbing layers can shield the first touch electrodes, which can reduce the reflectivity and improve the visibility of the touch display device under strong light. Those skilled in the art can understand that, in order to obtain a better effect of reflectivity reduction, all of the first touch electrodes are embedded in the first sub-light absorbing layers, i.e., each first touch electrode is embedded in a first sub-light absorbing layer.

According to an exemplary embodiment, the automobile further includes a light transmitting layer between the second electrode layer and the display panel; the plurality of first sub-light absorbing layers are embedded in the light transmitting layer. Accordingly, the light transmitting layer can fill the segment difference formed by the first electrode layer and the light absorbing layer to form a planar surface, and the second electrode layer can be formed on the planar surface without an excessively large segment difference or even without any segment difference, which greatly reduces the possibility of wire breakage on the second electrode layer and improves the reliability and the yield of the touch display device.

According to an exemplary embodiment, the light absorbing layer further includes a plurality of second sub-light absorbing layers arranged at intervals in the second direction; the plurality of second sub-light absorbing layers correspond to the plurality of second touch electrodes one by one; the plurality of second sub-light absorbing layers and the plurality of first sub-light absorbing layers form a grid structure. The structure can simultaneously reduce the large viewing angle brightness in the horizontal azimuth direction and the vertical azimuth direction. Accordingly, in addition to preventing the reflected image of the touch display device casted on the front windshield, the structure can also effectively reduce the visibility of the display image to the driver, thereby avoiding disturbing the driver and hence improving the driving safety. In particular, the structure may also be used as a display device in front of the front passenger's seat.

According to an exemplary embodiment, the first sub-light absorbing layers and the second sub-light absorbing layers are arranged periodically; the first sub-light absorbing layers have a first periodic distance of 30~300 μm, and the second sub-light absorbing layers have a second periodic distance of 30~300 μm. In this way, the touch display device can be characterized by a narrow viewing angle in the vertical azimuth direction (e.g., as indicated by a narrow viewing angle 200 in FIG. 10), and when applied to an in-vehicle display device, it can effectively prevent reflections of the images of the display panel casted on the windshield.

According to an exemplary embodiment, the first touch electrodes and the second touch electrodes have a width smaller than or equal to a width of the first sub-light absorbing layers and the second sub-light absorbing layers, and the first sub-light absorbing layers and the second sub-light absorbing layers have a width smaller than or equal to a width of a pixel definition layer in the display panel. Thus, an orthogonal projection of the pixel definition layer in a direction perpendicular to the display panel overlaps orthogonal projections of the first sub-light absorbing layers and the second sub-light absorbing layers in the direction perpendicular to the display panel, which avoids shielding the light emitting elements of the display panel and affecting the display effect.

In still another aspect of this disclosure, the exemplary embodiments provide a method of manufacturing the touch display device mentioned above. According to an exemplary embodiment, the method includes forming a first electrode layer, a light absorbing layer and a second electrode layer sequentially on a surface of the display panel by a patterning process. The first electrode layer includes a plurality of first touch electrodes arranged at intervals in a first direction; the light absorbing layer includes a plurality of first sub-light absorbing layers arranged at intervals in the first direction; at least one of the plurality of first sub-light absorbing layers corresponds to at least one of the plurality of first touch electrodes and is on a side of a corresponding first touch electrode facing away from the display panel; and the second electrode layer includes a plurality of second touch electrodes arranged at intervals in a second direction; the first direction intersects the second direction. In this way, with simple and convenient steps, the manufacture method is compatible with the existing manufacture process and requires no new devices or means, which facilitates industrialized production. The resultant touch display device has a narrow viewing angle and is particularly adapted for an in-vehicle display device, which avoids casting reflections on the windshield and affecting the driver's driving, and thus improves the driving safety significantly. Besides, by integrating the light absorbing layer and the touch electrodes, the thickness of the touch display device is greatly reduced, which facilitates bending and curving of the touch display device, thereby obtaining a flexible touch display device.

It should be noted that the patterning process herein refers to a step of forming a whole layer structure in advance and then patterning the whole layer structure. The method of forming the whole layer structure may be physical vapor deposition, chemical vapor deposition, spray coating, coating or the like, and the step of patterning may be etching or the like.

According to some exemplary embodiments, the step of forming the first electrode layer or the second electrode layer may include: coating a conductive paste and drying the conductive paste to form a conductive coating; and etching the conductive coating to form a pattern of the first electrode layer or a pattern of the second electrode layer. To take the formation of the first electrode layer as an example, a whole conductive layer may be formed on the surface of the display panel, and then a mask (which could be an independent mask or a mask formed by photoresist) is formed on a surface of the whole conductive layer facing away from the display panel, and after that, the conductive layer uncovered by the mask is removed (e.g., by wet etching, dry etching or the like), and then the mask is removed and a patterned first electrode layer is obtained. In a specific embodiment of this disclosure, a conductive past (a silver halide solution) may be coated and dried on the surface of the display panel to obtain a conductive coating, and then a photoresist layer is formed on a surface of the conductive coating facing away from the display panel, and next the photoresist is exposed and developed to form patterned photoresist, and after that the conductive layer uncovered by the patterned photoresist is etched to obtain a patterned first electrode layer. Those skilled in the art can understand that the steps for forming the light absorbing layer and the second electrode layer are the same, which will not be detailed herein for simplicity.

According to an exemplary embodiment, the method further includes a step of forming a light transmitting layer between the second electrode layer and the display panel. Specifically, the light transmitting layer may be formed by for example coating a light transmissive material and then UV curing it. This can significantly reduce the possibility of wire breakage on the second electrode layer and greatly improve the reliability and the yield of the product.

According to some exemplary embodiments, the step of forming the light transmitting layer may include: coating a light transmissive material and curing the light transmissive material to obtain a cured coating; and etching or imprinting the cured coating to form a trench penetrating the cured coating. The step of forming the light absorbing layer may include: casting a light absorbing material in the trench and curing the light absorbing material to form the light absorbing layer. In this way, the use of a mask can be reduced once, which simplifies the manufacture steps and reduces the production costs.

According to an exemplary embodiment, the method further includes a step of sequentially forming a polarizer and a protective film on a side of the second electrode layer facing away from the display panel. Specifically, the polarizer and the protective film may be prepared through conventional approaches, for example, the polarizer may be directly pasted or directly deposited, coated, etc., and the protective film may also be directly pasted or directly deposited, coated, or the like.

It should be noted that the first electrode layer, the light absorbing layer, the second electrode layer, the polarizer and the protective film involved in the method can be the same as in the aforementioned touch display device, which will not be detailed herein for simplicity.

In the depictions of this disclosure, it should be understood that terms such as "first" and "second" are used only for descriptive purposes and should not be construed as indicating or implying relative importance or hinting at the number of the indicated technical features. Thus, features defined by "first" and "second" can include one or more such features explicitly or implicitly. In the depictions of this disclosure, unless explicitly defined otherwise, "a plurality of" means two or more.

In the depictions of this description, terms such as "an embodiment", "some embodiments", "an example", "a specific example" or "some examples" are intended to mean that specific features, structures, materials or characteristics described with reference to the embodiment or example are contained in at least one embodiment or example of this disclosure. In this description, schematic expressions of the above terms do not necessarily refer to the same embodiment or example. Moreover, specific features, structures, materials or characteristics described thereby can be combined in a suitable manner in any one or more embodiments or examples. Besides, where no contradiction is introduced, those skilled in the art may combine and assemble different embodiments or examples described in this description and features of different embodiments or examples.

Although the exemplary embodiments have been shown and described, it can be understood that the embodiments are exemplary, and they cannot be construed as limiting this disclosure, and one having ordinary skills in the art can vary, change, substitute and modify the above exemplary embodiments within the scope of this disclosure.

What is claimed is:

1. A touch display device, comprising: a display panel and a touch module stacked together;

wherein the touch module comprises a first electrode layer, a light absorbing layer and a second electrode layer sequentially stacked on a surface of the display panel;

wherein the first electrode layer comprises a plurality of first touch electrodes arranged at intervals in a first direction;

wherein the light absorbing layer comprises a plurality of first sub-light absorbing layers arranged at intervals in the first direction; at least one of the plurality of first sub-light absorbing layers corresponds to at least one of the plurality of first touch electrodes and is on a side of a corresponding first touch electrode facing away from the display panel;

wherein the second electrode layer comprises a plurality of second touch electrodes arranged at intervals in a second direction; the first direction intersects the second direction, wherein the touch display device further comprises a light transmitting layer between the second electrode layer and the display panel; the plurality of first sub-light absorbing layers are embedded in the light transmitting layer; a top surface of the light transmitting layer is flush with a top surface of the first sub-light absorbing layer, and at least one of the plurality of second touch electrodes is in direct contact with the top surface of the first sub-light absorbing layer.

2. The touch display device according to claim 1, wherein the plurality of first touch electrodes correspond to the plurality of first sub-light absorbing layers one by one; each of the first touch electrodes is embedded in a corresponding first sub-light absorbing layer.

3. The touch display device according to claim 1, wherein the light transmitting layer is made of a transparent resin material.

4. The touch display device according to claim 1, wherein the light absorbing layer further comprises a plurality of second sub-light absorbing layers arranged at intervals in the second direction; the plurality of second sub-light absorbing layers correspond to the plurality of second touch electrodes one by one; the plurality of second sub-light absorbing layers and the plurality of first sub-light absorbing layers form a grid structure.

5. The touch display device according to claim 1, wherein the light absorbing layer is made of a black resin material.

6. The touch display device according to claim 4, wherein the first sub-light absorbing layers and the second sub-light absorbing layers are arranged periodically; the first sub-light absorbing layers have a first periodic distance of 30~300 µm, and the second sub-light absorbing layers have a second periodic distance of 30~300 µm.

7. The touch display device according to claim 4, wherein two adjacent first sub-light absorbing layers have a pitch of 10~295 µm, and two adjacent second sub-light absorbing layers have a pitch of 10~295 µm.

8. The touch display device according to claim 4, wherein the first touch electrodes and the second touch electrodes have a width smaller than or equal to a width of the first sub-light absorbing layers and the second sub-light absorbing layers; the first sub-light absorbing layers and the second sub-light absorbing layers have a width smaller than or equal to a width of a pixel definition layer in the display panel.

9. The touch display device according to claim 8, wherein the first sub-light absorbing layers and the second sub-light absorbing layers have a width of 5~30 µm, and the first sub-light absorbing layers and the second sub-light absorbing layers have a height of 5~50 µm.

10. An automobile comprising the touch display device according to claim 1.

11. The automobile according to claim 10, wherein the plurality of first touch electrodes correspond to the plurality of first sub-light absorbing layers one by one; each of the first touch electrodes is embedded in a corresponding first sub-light absorbing layer.

12. The automobile according to claim 10, wherein the light absorbing layer further comprises a plurality of second sub-light absorbing layers arranged at intervals in the second direction; the plurality of second sub-light absorbing layers correspond to the plurality of second touch electrodes one by one; the plurality of second sub-light absorbing layers and the plurality of first sub-light absorbing layers form a grid structure.

13. The automobile according to claim 12, wherein the first sub-light absorbing layers and the second sub-light absorbing layers are arranged periodically; the first sub-light absorbing layers have a first periodic distance of 30~300 μm, and the second sub-light absorbing layers have a second periodic distance of 30~300 μm.

14. The automobile according to claim 12, wherein the first touch electrodes and the second touch electrodes have a width smaller than or equal to a width of the first sub-light absorbing layers and the second sub-light absorbing layers, and the first sub-light absorbing layers and the second sub-light absorbing layers have a width smaller than or equal to a width of a pixel definition layer in the display panel.

15. A method of manufacturing the touch display device according to claim 1, comprising:
   forming the first electrode layer, the light absorbing layer and the second electrode layer sequentially on the surface of the display panel by a patterning process, and,
   forming the light transmitting layer between the second electrode layer and the display panel.

16. The method according to claim 15, wherein forming the first electrode layer or the second electrode layer comprises:
   coating a conductive paste and drying the conductive paste to form a conductive coating; and
   etching the conductive coating to form a pattern of the first electrode layer or a pattern of the second electrode layer.

17. The method according to claim 15, wherein forming the light transmitting layer comprises:
   coating a light transmissive material and curing the light transmissive material to obtain a cured coating; and
   etching or imprinting the cured coating to form a trench penetrating the cured coating;
   wherein forming the light absorbing layer comprises:
      casting a light absorbing material in the trench and curing the light absorbing material to form the light absorbing layer.

\* \* \* \* \*